United States Patent
Yates

[15] 3,674,913
[45] July 4, 1972

[54] TEMPORARY SUPPORT FOR ELECTRICAL OUTLET BOX

[72] Inventor: Kenneth Yates, Vinemont, Ala.

[73] Assignee: Donald B. Allison, Vinemont, Ala. ; a part interest

[22] Filed: July 9, 1971

[21] Appl. No.: 161,008

[52] U.S. Cl.....................174/48, 174/58, 220/3.5, 248/27, 248/DIG. 6
[51] Int. Cl.............................................H02g 3/12
[58] Field of Search............................174/48, 49, 58, 53, 57; 220/3.2, 3.3, 3.4, 3.5, 3.6, 3.7, 3.9; 248/DIG. 6, 204, 27

[56] References Cited

UNITED STATES PATENTS

| | | |
|---|---|---|
| 2,565,327 | 8/1951 | Shaw...................................248/27 X |
| 2,758,810 | 8/1956 | Good..................................220/3.9 X |
| 2,793,782 | 5/1957 | Austin.................................220/3.6 X |
| 3,180,595 | 4/1965 | Brunsting et al......................248/27 |

*Primary Examiner*—Lewis H. Myers
*Assistant Examiner*—D. A. Tone

[57] ABSTRACT

A temporary support for an electrical outlet box mounted inwardly of the outer surface of a wall. A transverse member extends across outer portion of box and engages outer surface of wall and outer portion of box upon movement thereof into substantial alignment with each other. Spring means operatively connected to transverse member has oppositely disposed end portions extending outwardly and detachably connected to box urging transverse member and box toward each other.

5 Claims, 5 Drawing Figures

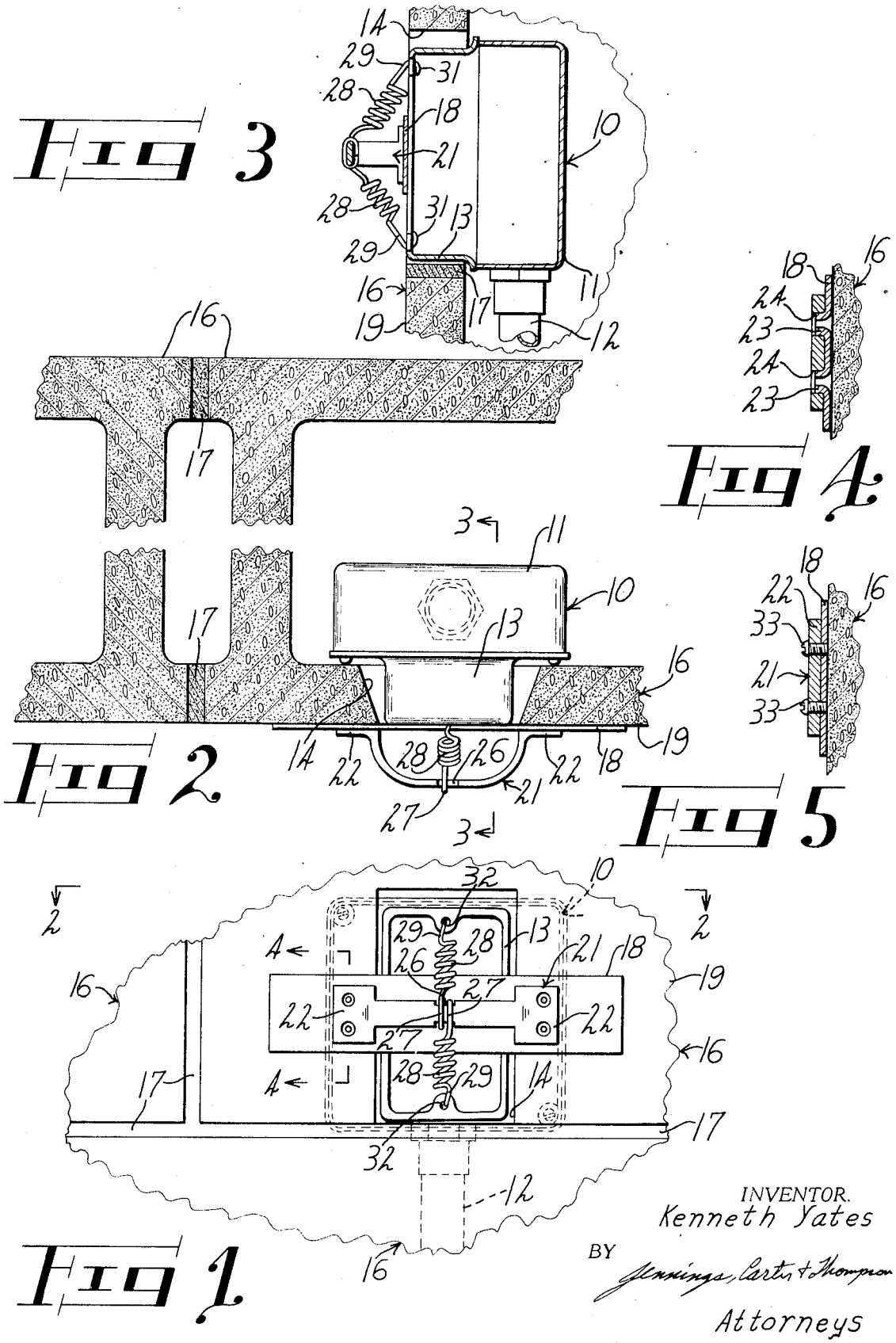

TEMPORARY SUPPORT FOR ELECTRICAL OUTLET BOX

BACKGROUND OF THE INVENTION

This invention relates to a temporary support for an electrical outlet box and more particularly to means for retaining an electrical outlet box or boxes in place during the installation of the usual conduits, wires and the like whereby the outlet box is retained in proper position until the box is anchored in place by mortar or the like.

Heretofore in the art to which my invention relates, difficulties have been encountered in installing electrical outlet boxes and the components, such as conduits, wires and the like, connected thereto due to the fact that the outlet box is usually left in a loose, unsupported position within a cavity provided in a supporting wall, such as a concrete block or the like. Accordingly, as the electrical conduits are connected to the outlet box and wires are drawn therethrough, the outlet boxes are often pulled inwardly of the cavity whereby the outlet box is not positioned properly relative to the outer surface of the concrete block. This not only necessitates considerable labor and effort in repositioning the outlet box but also often results in the outlet box being improperly installed. This is especially true in view of the fact that the outlet box is often moved before the mortar sets between the outlet box and the adjacent supporting surface, such as the cavity in a concrete block.

BRIEF SUMMARY OF THE INVENTION

In accordance with my invention, I provide a temporary support for the outlet box which comprises a transverse member which extends across an outer portion of the box in position to engage the outer surface of a supporting wall and the outer portion of the box upon movement of the box into alignment with the outer surface of the wall. Spring means is operatively connected to the transverse member and is provided with oppositely disposed ends which extend outwardly and are detachably connected to the outlet box whereby the outlet box and the transverse member are urged toward each other to thus retain the box resiliently in proper position whereby the box automatically returns to proper position relative to the wall in the event the box is moved during installation of other equipment connected to the outlet box.

Apparatus embodying features of my invention is illustrated in the accompanying drawing, forming a part of this application, in which:

FIG. 1 is a side elevational view showing my improved temporary support retaining an outlet box in proper position relative to a supporting wall;

FIG. 2 is a sectional view taken generally along the line 2—2 of FIG. 1;

FIG. 3 is a sectional view taken generally along the line 3—3 of FIG. 2;

FIG. 4 is an enlarged, fragmental, sectional view taken generally along the line 4—4 of FIG. 1; and, FIG. 5 is a fragmental, sectional view corresponding to FIG. 4 but showing a modified form of my invention.

Referring now to the drawing for a better understanding of my invention, I show a conventional type, electrical outlet box 10 which is shown as comprising a rectangular receptacle 11 which is adapted for connection to the usual conduits 12 for receiving electrical wiring. Secured to the forward side of the receptacle 11 is a rectangular member 13 which defines a plaster ring which is spaced from the cavity 14 provided in a wall structural member, such as a concrete block 16. As shown in FIG. 1, the concrete blocks are connected to each other by the usual mortar joints 17. After the outlet box 10 has been installed and the conduits 12 and the electrical wires are connected thereto in the usual manner, mortar, plaster or the like is positioned between the cavity 14 and the adjacent portion of the plaster ring 13 whereby the outlet box is anchored in proper position.

To retain the outlet box 10 in place during installation of the conduits 12 and the electrical wiring, I provide a temporary support unit which comprises a transverse member 18 which is of a length to extend across an outer portion of the outlet box 10 in position to engage the outer surface 19 of a wall-like member such as the concrete block 16. Accordingly, upon movement of the outer portion of the outlet box 10 into substantial alignment with the outer surface 19 of the concrete block 16, the transverse member 18 engages both the outer portion of the outlet box 10 and the outer surface 19, as shown in FIG. 2.

Detachably connected to the transverse member 18 is a support bracket 21 which is of a generally U-shape, as shown in FIG. 2, with the legs of the U-shaped member terminating in outturned flanges 22 which engage the outer surface of the transverse member 18. As shown in FIG. 4, the transverse member 19 is provided with outwardly projecting detents 23 in position to engage openings 24 provided in the flanges 22 whereby the support bracket 21 is detachably secured to the transverse member 18.

The base of the U-shaped support bracket 21 is reduced in size as at 26 for receiving loop-like ends 27 of elongated tension springs 28 which extend outwardly in opposite directions, as shown in FIG. 1, to provide oppositely disposed end portions 29 which are provided with hook members 31 which engage the usual openings 32 provided in the outlet box 10. Accordingly, the spring members 28 extend outwardly and inwardly, after installation, whereby the outlet box 10 and the transverse member 18 are urged toward each other. Since the transverse member 18 is held against inward movement relative to the cavity 14, the outlet box 10 is urged to a position whereby the outer portion thereof is in substantial alignment with the outer face 19 of the block 16, as shown in FIG. 2.

As shown in FIG. 5, I show a modified form of my invention in which the outturned flanges 22 of the support bracket 21 are secured rigidly to the transverse member 18 by retaining screws 33. Accordingly, the same transverse member 18 is always employed with the support bracket 21 shown in FIG. 5. On the other hand, with the structure shown in FIGS. 1 through 4, the effective length of the transverse member 18 may be varied by merely attaching the support bracket 21 to transverse members 18 of selected lengths to thus span various size cavities or openings 14.

From the foregoing description, the operation of my temporary support for outlet boxes will be readily understood. The outlet box 10 is installed in the usual manner whereby the conduit 12 and the electrical wires are operatively connected to the outlet box. After installation of the outlet box 10, the transverse member 18 is positioned across the cavity 14 and the support bracket 21 is positioned whereby the tension spring members 28 are in alignment with the openings 32 provided in the outlet box. With the support bracket 21 thus positioned, the hook members 31 are inserted in the openings 32 whereby the tension springs 28 urge the outlet box 10 toward the transverse member 18. As the outlet box 10 and the conduits 12 connected thereto are moved during installation of adjacent equipment, the outlet box 10 is free to move relative to the cavity 14 but always returns to proper position relative to the face 19 of the wall 16 due to the force exerted by the springs 28. Accordingly, the outlet box is constantly returned to proper position each time it is moved within the cavity 14. After complete installation of the electrical equipment, mortar, plaster or the like is applied between the cavity 14 and the adjacent portion of the plaster ring 13 while the tension springs 28 retain the outlet box in the exact, proper position until the mortar sets.

From the foregoing, it will be seen that I have devised an improved temporary support for an outlet box or boxes which is simple of construction, economical of manufacture and one which assures proper installation of the outlet box regardless of the amount of movement of the outlet box after initial installation of the box. While I have shown the apparatus as being associated with a single outlet box, it will be apparent that a gang of outlet boxes may be supported in place by merely connecting the outlet boxes to each other, if they are not so connected. Also, my improved apparatus may be employed to retain larger electrical boxes in place, such as switch boxes or the like, by positioning the transverse member 18 across the corner of the switch box whereby it is retained in position as it is properly anchored in place by mortar or the like.

While I have shown my invention in but two forms, it will be obvious to those skilled in the art that it is not so limited, but is susceptible of various other changes and modifications without departing from the spirit thereof.

What I claim is:

1. In a temporary support for at least one electrical outlet box mounted inwardly of the outer surface of a wall-like member:
   a. a transverse member for extending across an outer portion of said outlet box in position to engage said outer surface of a wall-like member and the outer portion of said outlet box upon movement of said outer portion into substantial alignment with said outer surface,
   b. spring means operatively connected to said transverse member and having oppositely disposed end portions extending outwardly, and
   c. means for detachably connected said end portions to said outlet box for urging said transverse member and said outlet box toward each other.

2. A temporary support for at least one outlet box as defined in claim 1 in which said transverse member is an elongated plate-like member.

3. A temporary support for at least one outlet box as defined in claim 1 in which said spring means operatively connected to said transverse member comprises:
   a. a support bracket carried by said transverse member and projecting outwardly from one side thereof, and
   b. elongated tension spring elements attached to said support bracket with oppositely disposed end portions of said spring elements extending outwardly.

4. A temporary support for at least one outlet box as defined in claim 3 in which said support bracket is a generally U-shaped member having outturned flanges detachably connected to said transverse member.

5. A temporary support for at least one outlet box as defined in claim 3 in which said end portions of said spring elements are provided with hook-like members.

* * * * *